No. 754,327. PATENTED MAR. 8, 1904.
J. B. MAHANA.
BRAKING MECHANISM.
APPLICATION FILED MAR. 2, 1903.
NO MODEL. 3 SHEETS—SHEET 1.
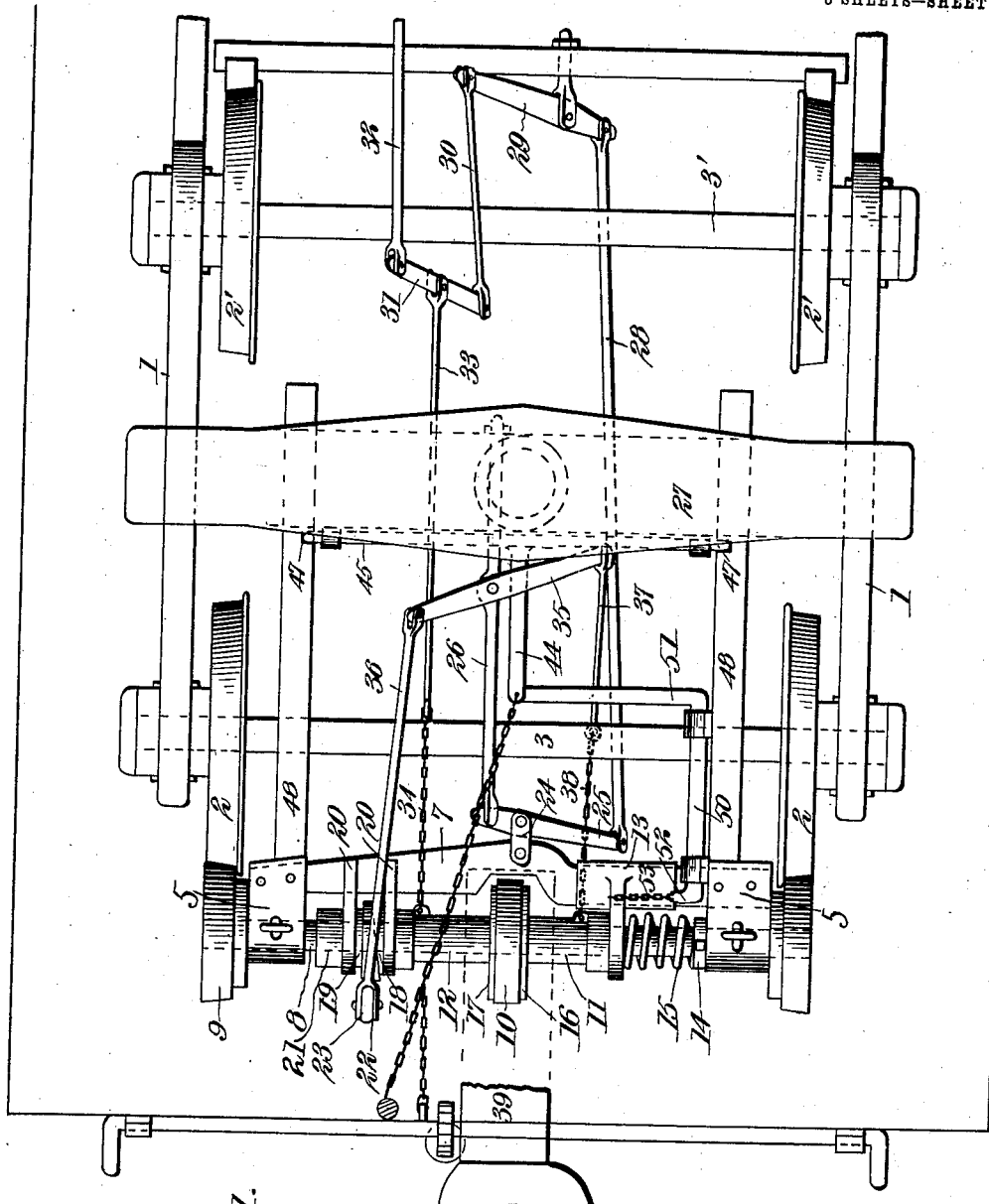

No. 754,327. PATENTED MAR. 8, 1904.
J. B. MAHANA.
BRAKING MECHANISM.
APPLICATION FILED MAR. 2, 1903.
NO MODEL. 3 SHEETS—SHEET 2.
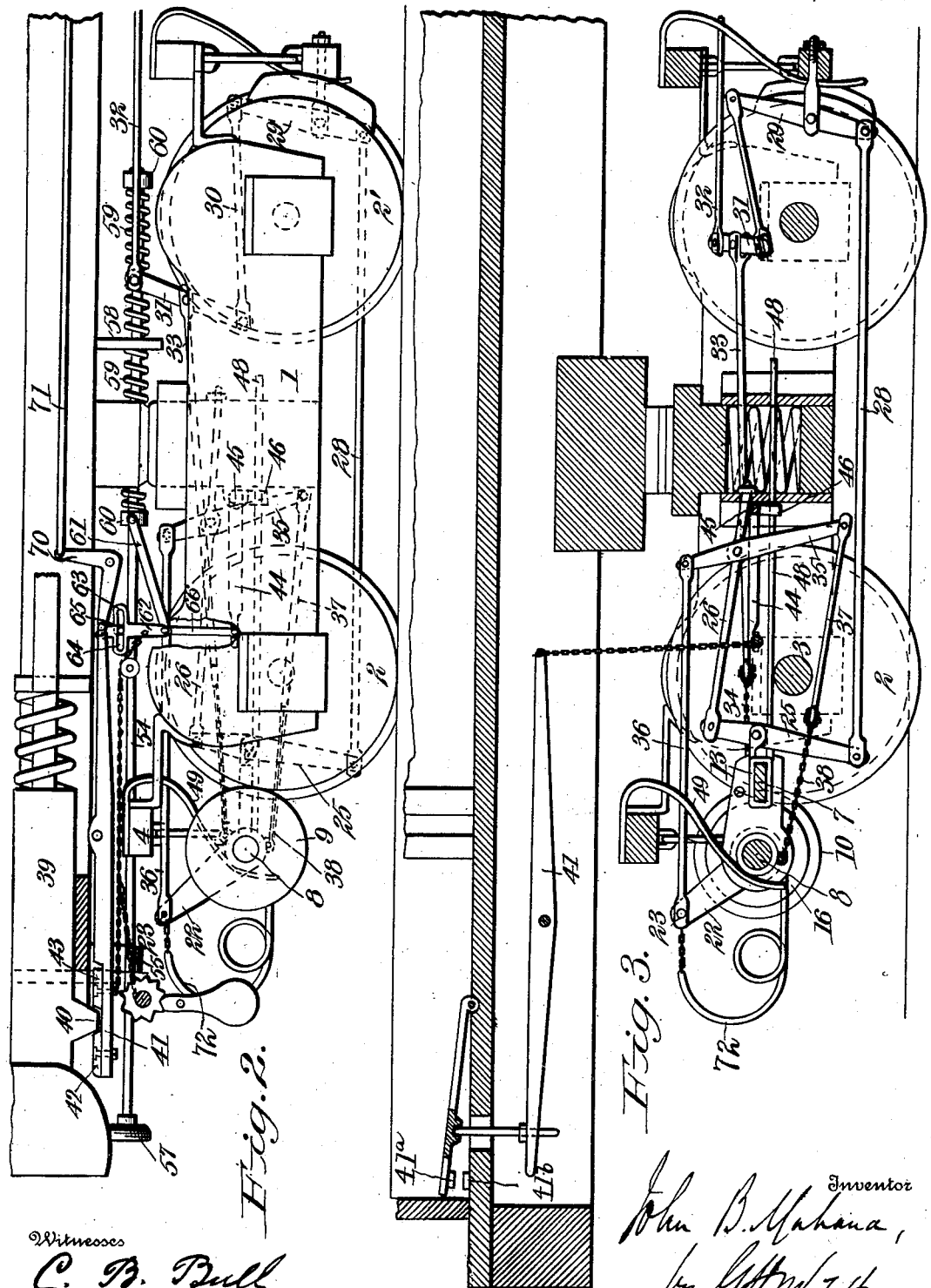
Witnesses
C. B. Bull
Inventor
John B. Mahana,
by
Attorneys No. 754,327. PATENTED MAR. 8, 1904.
J. B. MAHANA.
BRAKING MECHANISM.
APPLICATION FILED MAR. 2, 1903.
NO MODEL. 3 SHEETS—SHEET 3.
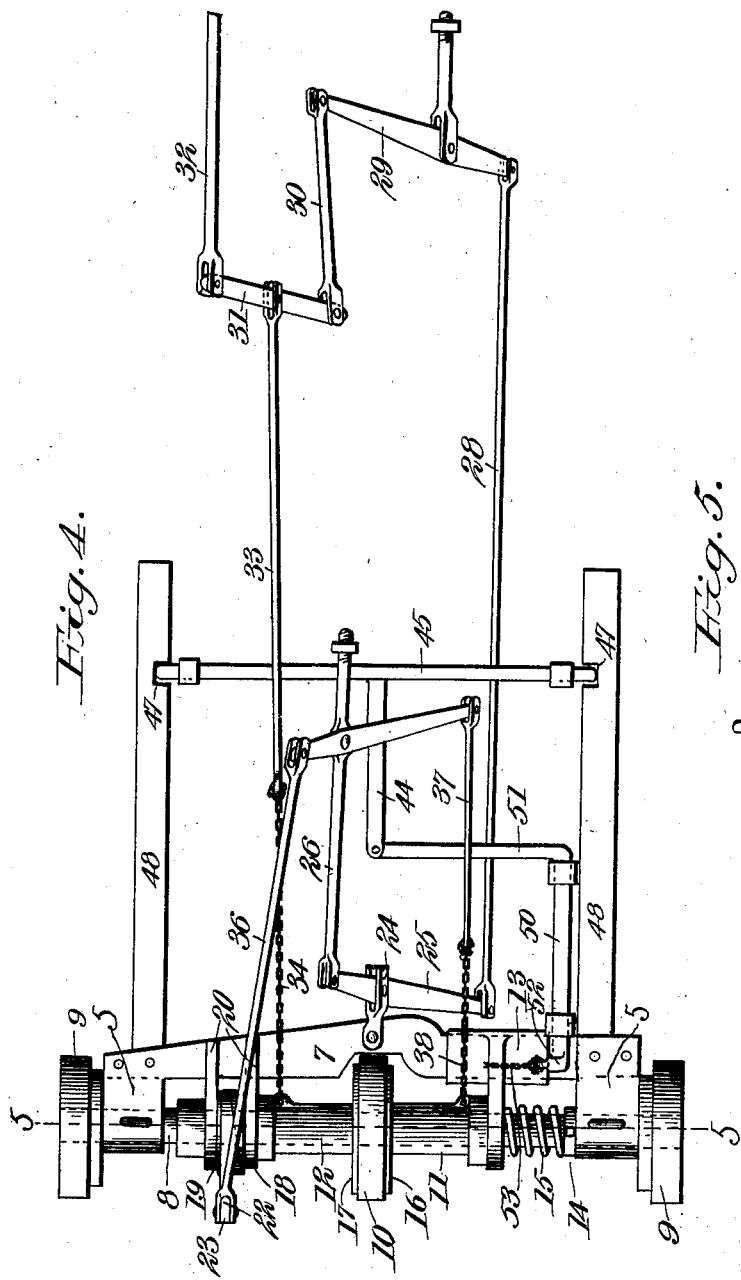
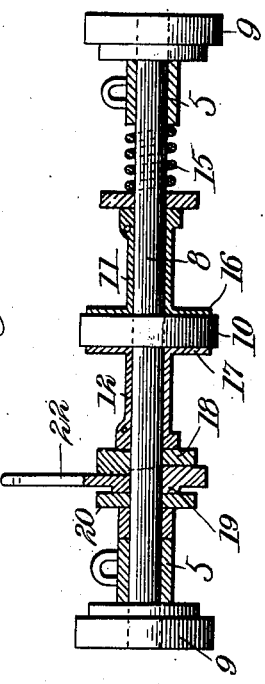
Witnesses
C. B. Bull
Inventor
John B. Mahana
Attorneys No. 754,327.

Patented March 8, 1904.

UNITED STATES PATENT OFFICE.

JOHN B. MAHANA, OF TACOMA, WASHINGTON.

BRAKING MECHANISM.

SPECIFICATION forming part of Letters Patent No. 754,327, dated March 8, 1904.

Application filed March 2, 1903. Serial No. 145,753. (No model.)

*To all whom it may concern:*

Be it known that I, JOHN B. MAHANA, a citizen of the United States, residing at Tacoma, in the county of Pierce and State of Washington, have invented a new and useful Improvement in Brake-Operating Mechanism, of which the following is a specification, reference being had to the accompanying drawings, forming a part thereof.

This invention relates to mechanism for applying brakes, and is adaptable to any use to which brakes are applied, especially to vehicles—such, for example, as steam-railroad cars, street and motor cars generally, automobiles, &c.

The main object of my invention is in the use of means whereby the brakes shall be at all times in condition to be automatically applied to the wheels of a vehicle in the event of an accident, loss of control by the operator, or when the vehicle is detached from other vehicles or is at rest. In the application of my invention, for example, to steam - railroad cars the brakes are always set with full force when the draft mechanism is in equilibrium, as when the car is at rest, and are automatically released only by the application to the draw-bar of a pulling or pushing force, which force will cause the draw-bar to move longitudinally, and whether moving in one direction or the other the brake-operating mechanism will by the action thereon of the draw-bar release the brakes.

My invention may be applied to trucks of any existing form without changing the arrangement of its parts and, indeed, in connection with the braking devices in common use, it being, if desired, an auxiliary to existing brake mechanisms, or it may be used entirely independently thereof. By preference I use it in connection with the more ordinary braking appliances, so that double security is insured, and in case of emergency the ordinary braking power may be greatly increased.

It is my intention in this application to claim, broadly, the operative mechanism designed to effect the above results regardless of the nature of the vehicle or the train of vehicles to which it may be applied.

In the further and general description of my invention which follows reference must be had to the accompanying drawings, in which—

Figure 1 is a plan view showing the application of my invention to a car-truck. Fig. 2 is a side elevation of the same. Fig. 3 is a longitudinal vertical section showing the application of the device to a street-car. Fig. 4 is a plan view of the main features of my invention detached from the truck. Fig. 5 is a transverse sectional view on the line 5 5 of Fig. 4.

Similar numerals of reference indicate similar parts in the several views.

Referring more especially to Figs. 1 and 2, let 1 represent the truck of a car or vehicle, which may be of any usual or approved construction. 2 2' indicate the wheels of the truck, of which 3 3' are the axles. The truck to which my invention is applied may be carried by 4 or a larger number of wheels, and the brakes may be applied to any pair of wheels or to all the wheels of the truck, as may be desired, the arrangement to that end being made without changing the principle of my invention. Suitably suspended from the cross-beam 4, on which ordinarily the brake-shoes are hung or otherwise supported by the truck, are two bearings 5 and 6, connected by what may be termed a "beam" 7, said bearings supporting a shaft 8, to each end of which is rigidly attached a friction-wheel 9, which, as hereinafter described, is adapted to bear at the proper time upon the tread of a wheel 2 of the vehicle to produce results hereinafter mentioned. Centrally of the length of the shaft 8 and integral therewith or rigidly attached thereto is a friction - disk 10, and mounted upon said shaft on opposite sides of the disk, so as to revolve therewith at times, are the sleeves 11 and 12. Surrounding the shaft 8 near one end and confined between a bearing 13, slidably mounted upon the beam 7, and an adjustable collar 14, is a spiral spring 15, the tendency of which is to force the bearing 13 in the direction of the friction-disk 10. Interposed between the bracket 13 and one side of the friction-disk 10 is the sleeve 11, having an enlarged inner end made in the form of a circular plate 16, which serves as a friction-surface to engage its side of the friction-disk 10. On the opposite side of the friction-disk 10 is the sleeve 12, also mounted loosely on the shaft 8 and similarly provided with a friction-surface 17, which engages its side of the friction-disk. 18 19 represent two collars or washers, each having a forked extension 20 fitting over the beam 7, as shown. Outside of the collar or washer 19 is a collar 21, rigidly secured to the shaft 8 and which serves as an abutment or stop for the washer 19 in the operation hereinafter described. The collar or washer 18 is furnished upon its inner side or surface with a wedge or cam surface, while its outer side, bearing against the end of the sleeve 12, is plain. The collar or washer 19 has plain inner and outer surfaces. Placed between the collars or washers 18 19 and having on one side a wedge or cam surface 22 is a lever 23, adapted to oscillate freely within a limited distance upon the shaft 8. To the beam 7 is connected centrally a shackle 24, in which is fulcrumed one of the levers 25 of the brake-operating mechanism. To the shorter arm of said lever is attached a rod 26, the other end of which is rigidly attached to the bolster 27 of the truck, while to the longer arm of said lever is secured a rod 28, which connects with the short arm of a lever 29, pivoted to the brake-beam of the truck. The opposite or longer arm of said lever 29 connects with a rod 30, to which is secured the lever 31, having at its opposite end the rod 32, leading to the brake-beams of the other truck of the car. To the lever 31 is centrally attached the rod 33, the opposite end of which is connected by a chain 34 to the sleeve 12. Pivoted to the rod 26 near its connection with the bolster 27 is a lever 35, the short arm of which is connected, by means of a rod 36, with the end of the cam-lever 23, as shown. The opposite or long end of the lever 35 is connected, by means of a rod 37 and a chain 38, to the sleeve 11, the chain being wound on said sleeve when the plate 16 is forced by the spring 15 into contact with the friction-disk 10.

Before describing other parts of this invention and their application to the general uses here illustrated it may be mentioned that normally—that is to say, when the vehicle is running without the necessity of a braking action—the spring 15 is compressed between the bracket 13 and the adjustable collar 14, leaving the sleeve 11, with its friction-plate 16, loose upon the shaft 8, so that said plate exerts no frictional force upon its side of the central friction-disk 10; but when the braking action is required the conditions are changed in a manner hereinafter specified, so that said spring shall be released and permitted to exert its power against the bracket 13, forcing the sleeve 11, with its friction-plate 16, against the friction-disk 10, thus winding the chain 38 about the sleeve 11 and drawing upon the long arm of the lever 35, causing its shorter arm to draw with greatly-increased power upon the cam-lever 23, whose cam-face 22, acting with great force against the corresponding cam-face of the collar or washer 18, will force the sleeve 12, with its friction disk or surface 17, against its side of the central disk 10. The chain 34, attached to the sleeve 12, will thereupon be wound about the sleeve and through the described system of levers and rods cause the brake-shoes to be applied to the wheels with great force.

39 indicates a draw-bar of usual construction, from the bottom of which depends a lug 40, having inclined sides. Below the draw-bar and pivoted to the frame of the car is a lever 41, its outer end lying closely to the lug 40, which when the brake is applied rests between two blocks 42 43, adjustably attached to the lever 41, their inner sides being inclined to permit the lug 40 to ride over them as the draw-bar is moved in or out.

54 indicates a rod supported in brackets 55 under the car-body and extending longitudinally thereof, its length being a little less than the distance between the faces of the coupler-heads 56. Each end of the rod 54 is provided with a buffer head or plate 57 to engage at certain times with a similar arrangement on another car or a locomotive. The rod 54 passes through a plate 58, attached to the car-body, on each side of which plate and surrounding the rod is a spring 59, a collar 60, adjustable on the rod 54, bearing against the outer end of each spring. The left-hand collar 60 is pivotally attached to a connection 61, which in turn is pivoted to a link 62, depending from the inner end of the lever 41. The link 62 has formed thereon two projecting arms 63, having a slightly-curved horizontally-disposed slot 64 therethrough, which serves as a runway for a roller 65, pivoted on the upper end of a rod 66, the latter being jointed to an arm 44, which projects forwardly from a rock-shaft 45, extending crosswise of the truck and journaled in bearings on the bolster 27. Each end of the rock-shaft 45 is provided with a downwardly-extending arm 46, adapted to engage a notch 47, formed in a horizontal bar 48, projecting rearwardly from each end of the beam 7.

When the parts are in the position shown in Fig. 2—that is, with the draw-bar springs in equilibrium—the brakes will be set, their release being accomplished by the following means: To the cross-beam 4 are bolted springs 49, which press against the bearings 5 6, supporting the shaft 8 and the friction-wheels 9, the force of the springs tending to hold the friction-wheels in contact with the truck-wheels 2. This tendency is prevented when any strain is applied to the draw-bar 39 by the fact that the lug 40 on the draw-bar rides over one or the other of the blocks 42 or 43 on the outer end of the lever 40 and raises its inner end, which through the connection of the link 62 and the rod 66 with the arm 44 rocks the shaft 45. The downwardly-extending arms 46 on the outer ends of said shaft are consequently operated to thrust the notched horizontal bars 48, with the attached bearings 5 and 6, forwardly, thereby tensioning the springs 49 and carrying the friction-wheels 9 away from the truck-wheels 2. When the arm 44 rocks the shaft 45, it at the same time rocks a longitudinally-disposed shaft 50, a substantially horizontal arm 51 thereon being loosely connected to the arm 44, as seen in Fig. 1. The opposite end of the shaft 50 is provided with an upwardly-projecting arm 52, connected to the bracket 13 by a chain 53, the arrangement being such that as the arm 51 is raised the upright arm 52 will slide the bracket 13 and compressing the spring 15 release the sleeve 11 from contact with the friction-disk 10. A spring 54, attached to some fixed part and to the lever 23, to which the rod 36 is also connected, draws on said lever and rod and unwinds the chain from the sleeve 11. The movement of the lever 23 releases its cam-surface 22 from engagement with the cam-surface on the collar or washer 18, disengaging the sleeve 12 from contact with the friction-disk 10. The sleeve 12 being thus left free to revolve, the chain 34 is unwound therefrom and the brakes are released. Whenever the draw-head 39 is in such position as to permit the lug 40 thereon to enter the notch between the blocks 42 43, the inner end of the lever 41 will be drawn down, and the springs 49 being left free will immediately force the friction-wheels 9 into contact with the truck-wheels 2. At the same time the rock-shaft 50 is left free to turn, in consequence of which the spring 15 presses the sleeve 11 into contact with the friction-disk 10, which, rotating the sleeve, winds the chain 38 thereon, drawing the arm or lever 23 rearwardly. The arm 23, as hereinbefore described, moves the sleeve 12 into contact with the friction-disk 10, which rotates the sleeve to wind the chain 34 thereon, and thus apply the brakes.

An elbow-lever 70, pivoted to the car body or frame and connected to the lever 41, is joined by a rod 71 to a similar elbow-lever at the opposite end of the car, which is attached to a like lever 41, the object being to apply the brakes in unison to the wheels of both trucks when the car is so equipped.

When on grades and at other times when it is desired to apply the brakes to a train of cars, a device of any suitable construction on the locomotive is caused to push the longitudinal rod 54 endwise, which action through the connection 61 causes the link 62 to swing on its pivotal connection with the lever 41 out of its normally vertical position and lower one or the other end of the runway 64. The roller 65 on the rod 66 immediately travels to the lower end of the runway, in which position the arms 44 and 51 are released and the brakes applied, as hereinbefore described.

The springs 59, surrounding the rod 54, return the rod and the parts operated thereby to normal position when the rod is relieved from pressure.

In Fig. 3 my invention is shown applied to a street-car of ordinary construction, preferably of the motor-driven type. The principle involved in the application of the brakes and the mechanism employed to that end are substantially the same as in the figures already described, the same numerals in Fig. 3 referring to corresponding parts found in said other figures. In the application of the invention to street-car use the lever 41 is directly acted upon by the foot of the motor-man through the medium of a treadle $41^a$, the downward movement of which is checked by means of a stop $41^b$.

I do not restrict myself to the exact details of construction, combination, and arrangement herein set forth, it being obvious that minor variations thereof not involving the exercise of invention may be made by the skilled mechanic, and such departures from what is herein described and claimed not involving invention I consider as within the scope and terms of my claims.

Having thus described my invention, I claim—

1. Combined in a brake-operating mechanism, wheels, as of a vehicle, a shaft adapted to be rotated by frictional engagement with the wheels, means for moving the shaft to and from the wheels, a friction-disk on said shaft, sleeves loosely mounted on said shaft and adapted to be brought into engagement with and driven by said friction-disk, and means connected to one of said sleeves for operating the brakes, substantially as set forth.

2. Combined in a brake-operating mechanism, wheels, as of a vehicle, a shaft adapted to be rotated by frictional engagement with said wheels, a friction-disk on said shaft, a sleeve loosely mounted on said shaft and adapted to be driven by said disk, a second sleeve on the shaft adapted to be brought into engagement with said disk by the rotation of the first-mentioned sleeve, and means connected to said second sleeve for operating the brakes, substantially as set forth.

3. Combined in a brake-operating mechanism, wheels, as of a vehicle, a shaft adapted to be rotated by frictional engagement with said wheels, a draw-bar, means controlled by the draw-bar for moving the shaft to and from the wheels, a friction-disk on said shaft, a sleeve loosely mounted on said shaft and adapted to be driven by said disk, a second sleeve on the shaft adapted to be brought into engagement with said disk by the rotation of the first-mentioned sleeve, and means connected to said second sleeve for operating the brakes, substantially as set forth.

4. Combined in a brake-operating mechanism, wheels, as of a vehicle, a shaft adapted to be rotated by frictional engagement with said wheels, a buffer, such as a draw-bar, means controlled by the draw-bar for moving the shaft to and from the wheels, a friction-disk on said shaft, a sleeve loosely mounted on said shaft and adapted to be driven by said disk, mechanism controlled by the draw-bar for engaging said sleeve with said disk, a second sleeve on said shaft adapted to be brought into engagement with said disk by the rotation of the first-mentioned disk, and means connected to said second sleeve for operating the brakes, substantially as set forth.

5. Combined in a brake-operating mechanism, wheels, as of a vehicle, a shaft adapted to be rotated by said wheels, a friction-disk on said shaft, a buffer such as a draw-bar, means controlled by the draw-bar for moving the shaft to and from the wheels, mechanism operated by said friction-disk for applying the brakes, and other means controlled by said draw-bar and driven by said disk for moving said mechanism into operative engagement with the aforesaid disk, substantially as set forth.

6. Combined in a brake-operating mechanism, wheels, as of a vehicle, a shaft having friction-wheels adapted to be rotated by engagement with the vehicle-wheels, means for moving the shaft to and from the vehicle-wheels, a friction-disk on said shaft and adapted to be driven by said friction-disk, a braking mechanism operated by the rotation of said sleeve, a lever-operated cam for engaging said sleeve with said disk, and means also driven by said friction-disk for moving said lever-operated cam, substantially as set forth.

7. In braking mechanism, a car, wheels therefor, and a frictionally-rotatable shaft combined with means for automatically moving said shaft to and from said wheels, mechanism operated through the medium of said shaft for applying and releasing the brakes, and means for engaging and disengaging said mechanism with and from said shaft, substantially as set forth.

8. In braking mechanism, a car, wheels therefor, a buffer such as a draw-bar, and a frictionally-rotatable shaft combined with means controlled by said draw-bar for automatically moving said shaft to and from said wheels, mechanism operated through the medium of said shaft for applying and releasing the brakes and means simultaneously operated by said draw-bar for engaging and disengaging said mechanism with and from said shaft, substantially as set forth.

In testimony whereof I hereunto set my hand and seal.

JOHN B. MAHANA. [L. S.]

In presence of—
  B. A. RICHARDSON,
  M. H. EDGEWORTH.